Sept. 18, 1928.
S. NISHIDA ET AL
1,684,776
SAFETY DEVICE FOR MOTOR CARS
Original Filed March 14, 1925   2 Sheets-Sheet 1
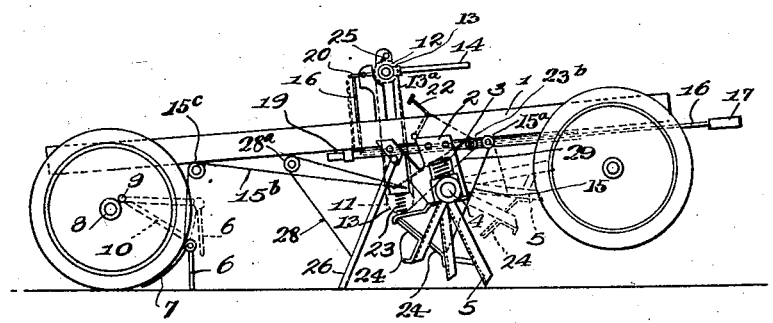
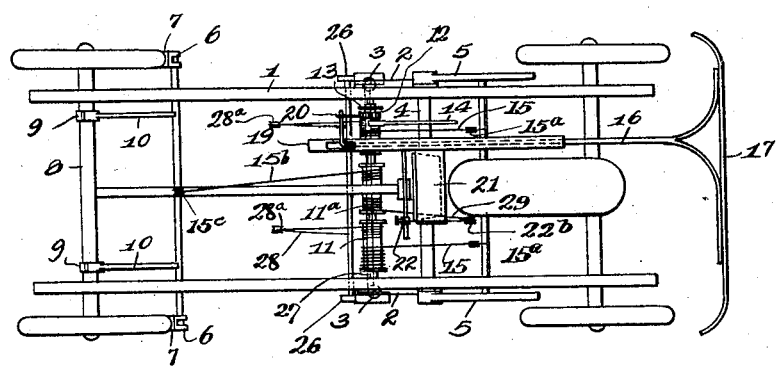
Inventor
Shinkichi Nishida,
Minoru Ota, and
Sensuke Inose
By B. Singer
Attorney

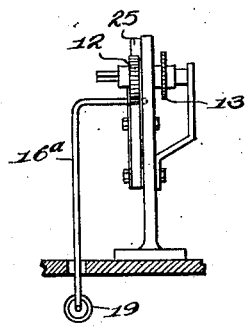
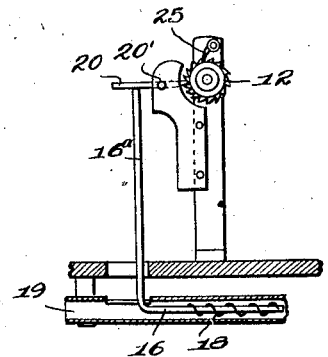
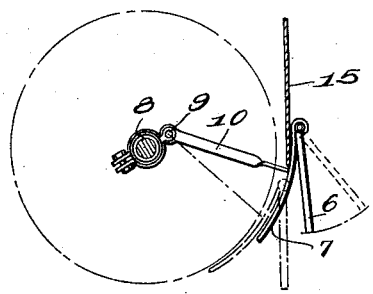
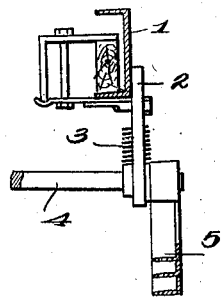
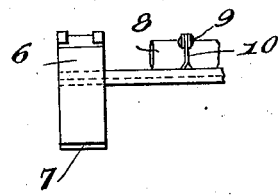

Patented Sept. 18, 1928.

1,684,776

UNITED STATES PATENT OFFICE.

SHINKICHI NISHIDA AND MINORU OTA, OF TOKYO, AND GENSUKE INOSE, OF TAKI-NOGAWA-MACHI, NEAR TOKYO, JAPAN, ASSIGNORS TO GOSHIKAISHA JIDOSHA KYUJOKI SEISAKUSHO, OF TOKYO, JAPAN, A COMPANY OF JAPAN.

SAFETY DEVICE FOR MOTOR CARS.

Application filed March 14, 1925, Serial No. 15,626. Renewed August 6, 1928.

This invention relates to a safety device for motor cars or other vehicles, and has for its object to provide a safety device which is adapted to be brought into action automatically, as soon as the fender bar strikes against a human body or any other object, to raise the front wheels from the ground, at the same time stopping the operation of the driving axle and applying a brake action onto the rear wheels, thus effectively protecting the human body or other object which has been passed under the upraised front wheels of the vehicle.

A constructional example of the subject matter of the present invention is illustrated in the accompanying drawings, in which:

Fig. 1 is a side elevation of a motor car with its body removed and showing the general arrangement of the device according to this invention.

Fig. 2 is a plan thereof.

Fig. 3 is a detail of the ratchet mechanism.

Fig. 4 is a front view thereof.

Figs. 5 and 6 are details of the brake for the rear wheels.

Fig. 7 is a front view of the bracket as mounted on the frame.

The frame 1 of the vehicle is provided on both sides with brackets 2. Journaled in said brackets 2 is a rod 4, which is normally pressed downwardly by springs 3 provided at its ends. Secured to each end of the rod 4 is a leg or support 5 composed of three members of different length.

Brake legs 6 for the rear wheels are pivoted to the brake shoes or plates 7. Eccentric members 9 are secured to the rear axle case 8, and are connected with said brake shoes 7 by means of links 10. Said parts are so arranged that when the brake legs 6 fall to the position shown in dotted lines in Fig. 5 the brake shoes 7 are brought into frictional contact with the circumference of the rear wheel by a lever action.

A pair of reels 11 which are spaced apart is mounted on a shaft 27 which connects the brackets 2 and between said reels is a reel $11^a$. The reels 11 are connected by cables 15 to the legs 5, said cables passing over direction pulleys $15^a$. The reel $11^a$ is connected by a cable $15^b$ with the legs 6, said cable passing over a direction pulley $15^c$. For driving said shaft and said reels a ratchet 12 is provided, near the driver's seat, said ratchet being connected to said shaft 27 by means of a pair of sprocket wheels 13 and a chain $13^a$, so that the shaft and reels may be rotated by operating the handle 14. The cables 15 are normally wound up so as to hold the legs 5 and 6 in raised position as shown in dotted lines in Figure 1.

Movable rod 16 carries at its forward end a fender bar or feeler 17 and is normally pushed forwardly by a spring 18 (see Fig. 3) mounted in the guide tube 19. The rear portion of the movable rod 16 is bent upwardly, and it engages with the latch 20 maintaining the latter in latching engagement with the teeth of the ratchet 12. The latch 20 is pivoted at 20'. Interposed between the engine shaft and the driving axle is a friction clutch 21 which is released by the depression of a pedal 22. Said pedal 22 is connected by a cable 29 to the reel $11^a$, said cable passing over a direction pulley $22^b$, the arrangement being such that the said cable connected to the pedal 22 is slackened when the legs 5 and 6 are raised, on the contrary when the legs 5 and 6 are lowered the said cable connected to the pedal is tensioned and wound around the reel $11^a$, thus pulling the pedal 22.

Attached to the brackets 2 are springs 23 adapted to engage with and absorb the shock of the legs 5 when the latter are moved into upright position as shown in full lines in Fig. 1. For this purpose each leg member 5 is provided with an ear 24 adapted to be engaged by the springs 23. Pivoted to each of the brackets 2 is an auxiliary supporting leg 26 each of which is connected by a cable 28 to one of the reels 11. A direction pulley $28^a$ is provided for each cable 28.

The operation of this invention is as follows: By operating the handle 14 the reels 11, $11^a$ are rotated through the sprocket and chain drive 13, $13^a$ so that the legs 5 and 6 are normally held in their raised position, as shown in dotted lines in Fig. 1. The pawl 25 is normally held disengaged from the ratchet 12, of which the reverse rotation is normally prevented by means of the latch 20, the rear end of the latter being normally engaged by the upturned rear end $16^a$ of the movable rod 16, as shown in Fig. 3. Now, as soon as a human body or any other object is struck by the fender bar 17, the rod 16 will be moved rearwardly compressing the spring 18, whereupon the rear portion of said rod 16 will release the latch 20 from the ratchet 12. Thus, the legs 5, 6 and 26 fall, by the action of gravity, the free end of each leg standing on the ground. The legs 5 on falling down onto the ground will serve, co-operating with the momentum of the vehicle, to raise the front part of the vehicle, and the latter is held in its raised position by the legs 5 and 26. At the same time, the pedal 22 will be pulled by the cable 29 connected thereto, on account of the lowering movement of the legs 5, 6 and 26, thereby causing the release of the friction clutch 21 to stop the operation of the rear axle. When the leg 6 falls down, it will stand on the ground and cause the frictional contact of the brake shoe 7 to the circumferential part of the rear wheel by a lever action, thus stopping the movement of the entire vehicle. In said operation, the ear 24 of the leg 5 will come into engagement with the spring 23 and the latter serves to absorb any shock of the legs 5. For releasing the legs, the reels 11 11ª are rotated by operating the handle 14 so that first the legs 26, and then the legs 5 and 6 are raised into normal position, and the pedal 22 is released. The latch 20 is then held in latching engagement with the ratchet 12 by means of the rear end of the rod 16.

As will be seen from the foregoing, according to the present invention, when the fender bar 17 strike against a human body or any other object, the front part of the vehicle is at once raised, at the same time the axle drive is interrupted, and a brake action is applied to the rear wheels, thus effectively preventing any traffic accident.

Having herein described our invention, what we claim and desire to secure by Letters Patent is:

1. A motor car having a supporting leg, said leg having a pivot mounted on the car for vertical movement, a spring pressing the pivot of said leg downwardly, a reel or drum connected by means of a cable to said leg, a handle operatively connected to said reel, a means for normally holding the reel in the required position the said leg to be held in raised position, a fender element, and means connected to said fender element for allowing the leg to fall when the fender bar strikes against any object.

2. A motor car having a supporting leg normally held in raised position, a reel connected by a cable to said leg, a brake shoe for the rear wheel, a second leg pivoted to said brake shoe and connected to said reel by a cable and normally held in raised position, a friction clutch interposed between the engine shaft and the driving axle, a pedal for actuating said clutch, a cable connecting said pedal to the said reel.

3. A motor car having a normally ineffective supporting element to raise the front end of the car in an emergency, said supporting element being pivotally mounted on the car and provided with a plurality of radially arranged legs of unequal length.

4. A motor car having a normally ineffective supporting element to raise the front end of the car in an emergency, said supporting element being pivotally mounted on the car and provided with a plurality of radially arranged legs of unequal length, the pivot of said element being mounted for vertical movement, a spring to cushion said pivot and element, and a spring directly effective on the legs of said element to cushion the same.

In testimony whereof we affix our signatures.

SHINKICHI NISHIDA.
MINORU OTA.
GENSUKE INOSE.